INVENTOR
FREDERICK C. HEYLMAN.
BY
Carlos P. Griffin
ATTORNEY

UNITED STATES PATENT OFFICE.

FREDERICK C. HEYLMAN, OF MARTINEZ, CALIFORNIA.

EXPANSION PIPE-JOINT.

1,363,974.  Specification of Letters Patent.  Patented Dec. 28, 1920.

Application filed June 21, 1919. Serial No. 305,861.

*To all whom it may concern:*

Be it known that I, FREDERICK C. HEYLMAN, a citizen of Holland, who has declared intention to become a citizen of the United States, residing at Martinez, in the county of Contra Costa, State of California, have invented new and useful Expansion Pipe-Joints, of which the following is a specification, in such full and clear terms as will enable those skilled in the art to construct and use the same.

This invention relates to an expansion joint for pipes and one of its objects is to produce a high pressure expansion joint which will not only allow the pipe to move longitudinally but will also permit a certain amount of lateral movement as well without injury thereto.

Another object of the invention is to produce a connection which will be capable of preventing the pipe joints from telescoping over each other and which will be provided with means to prevent the pipes from drawing out of the inclosing sleeve.

Other objects of the invention will appear as the description proceeds.

An embodiment of the invention is shown in the drawings in which the same reference numeral is applied to the same portion throughout, but I am aware that there may be modifications thereof.

Figure 1:
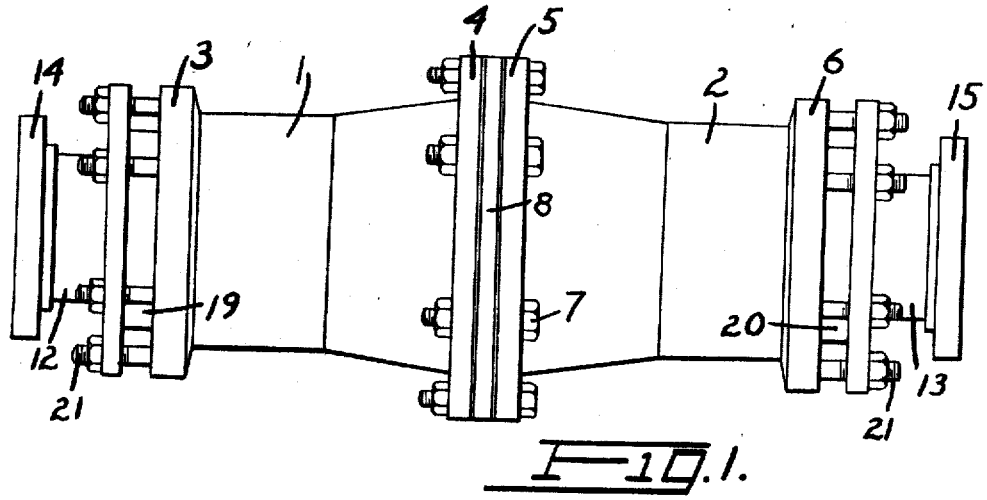
Figure 1 is a side elevation of the complete expansion joint.
Figure 2:
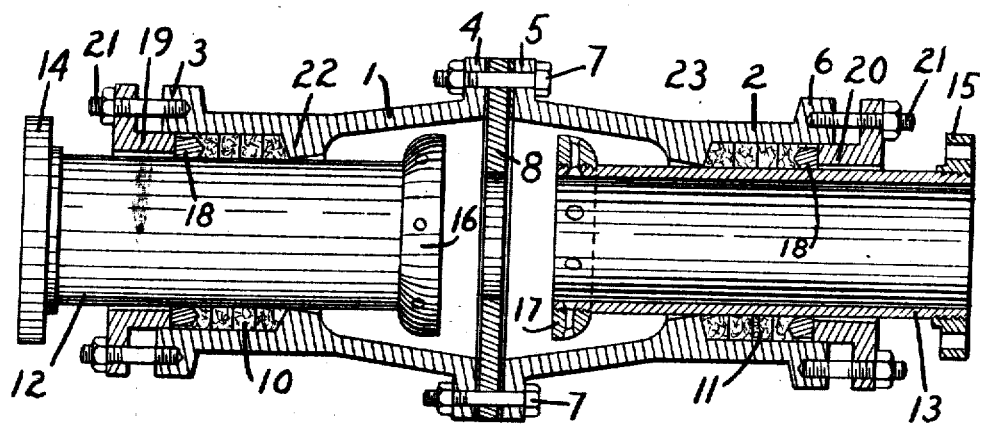
Fig. 2 is a vertical sectional view of the same.
Figure 3:
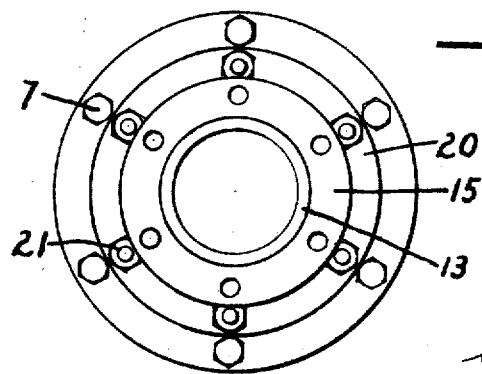
Fig. 3 is an end view.

The joint comprises two main sleeves 1 and 2, each of which has flanges at its ends as indicated at 3 to 6 inclusive.

These sleeves are secured together by means of the bolts 7 which pass through the flanges 4 and 5 and a plate 8 is secured between the two sleeves against which the pipes abut should they move toward each other.

The outer end of the sleeves is chambered out to receive the packing 10, 11 through which the pipes 12 and 13 pass. Each pipe has a flange, see 14, 15, to connect it to the next adjacent pipe and each pipe is provided with a flange as shown at 16, 17 screwed and riveted thereon to prevent the two pipes from drawing out of the coupling.

A ring 18 tightly surrounds each pipe just back of the packing, and said rings and the packing are held in place by means of the flanged gland rings 19 and 20; bolts 21 being used for this purpose.

The sleeves 1 and 2 are each provided with an interior flange as shown at 22 and 23 and it will be noted that the rings 18 do not touch the sleeves 1 and 2, while the rings 19 and 20 do not touch the pipe; so that there is a possibility of considerable lateral movement of the two pipes in the sleeves.

Should the pipes pull away from each other, the flanges 16 and 17 will prevent them from pulling out of the sleeves, and if they move toward each other, the plate 8 will prevent them from telescoping one over the other.

It will be understood that the sleeves 1 and 2 touch the pipes 12 and 13 in one plane only, while the glands 19 and 20 do not touch them and as the rings 18 and packing rings 10 and 11 are more or less flexibly connected with the two sleeves the pipes have considerable lateral movement without injury to the sleeves. The only place the sleeves 1 and 2 touch the pipes is at the inwardly projecting flanges 22.

What I claim is as follows, but various modifications may be made in the construction shown in the drawings and above particularly described form, within the purview of my invention.

I claim:

1. An expansion joint for pipes comprising a pair of flanged sleeves for holding two pipes together, a flange on each pipe to prevent them from being drawn out of the sleeves, an inwardly projecting flange carried by each sleeve, each contacting with the pipes in a single plane and packing for the pipes which will permit lateral movement of said pipes with respect to the sleeve.

2. An expansion joint for pipes comprising a pair of flanged sleeves for connecting two pipes, means to connect the two sleeves together through their flanges, a plate between the sleeves for preventing the pipes from telescoping and a flange on each pipe to prevent the pipes from pulling out of the sleeves.

3. An expansion joint for pipes comprising a pair of flanged sleeves for connecting two pipes, means to connect the two sleeves together through their flanges, means between the sleeves for preventing the pipes from telescoping one over another, means on each pipe to prevent it from being pulled out of its sleeve and packing to prevent leakage around each pipe.

4. An expansion joint for pipes comprising a pair of flanged sleeves for connecting two pipes, means to connect the two sleeves together through their flanges, a plate between the flanges of the sleeves for preventing the pipes from telescoping one over another, a flange on each pipe to prevent the pipes from pulling out of the sleeves, and a packing around the pipes capable of allowing a lateral movement of said pipes.

In testimony whereof I have hereunto set my hand this 11th day of June, A. D. 1919.

FREDERICK C. HEYLMAN.

Witnesses:
E. STARK,
I. M. WITTENMYER.